C. P. MAXFIELD.

Assignor to E. T. COVELL.

Metallic Can or Vessel.

No. 8,015. Reissued Dec. 25, 1877.

*Witnesses:*

E. E. Masson

E. A. Rick

*Inventor:*

Charles P. Maxfield by A. Pollok his attorney

N. PETERS, PHOTO-LITHOGRAPHER, WASHINGTON, D. C.

UNITED STATES PATENT OFFICE.

CHARLES P. MAXFIELD, OF FAIRHAVEN, ASSIGNOR TO EDWARD T. COVELL, OF NEW BEDFORD, MASSACHUSETTS.

IMPROVEMENT IN METALLIC CANS OR VESSELS.

Specification forming part of Letters Patent No. 196,758, dated November 6, 1877; Reissue No. 8,015, dated December 25, 1877; application filed December 17, 1877.

*To all whom it may concern:*

Be it known that I, CHARLES P. MAXFIELD, of Fairhaven, Massachusetts, have invented certain new and useful Improvements in Metallic Cans or Vessels, of which the following is a specification:

This invention relates to the construction of metallic cans or vessels, and more particularly to the manner of uniting the heads or ends with the body of such cans or vessels.

As heretofore constructed, metallic cans or vessels have been found deficient in that the ends or heads, whether or not molten solder was used in connection with the joints or seams, were liable to spring off or part asunder, permitting leakage of their contents, and thus occasion great loss in or danger to the cargoes of which they constitute a part.

The object of my present invention is to overcome this objection, and at the same time to furnish a rigid, cheap, durable, and air-tight vessel, without any excessively protruding flanges, which are liable to be bent in, whereby the seams are frequently opened—in other words, cans or vessels well adapted to contain liquids of any description, however dangerous they may be, such as petroleum or other hydrocarbon fluids.

My said invention consists in a peculiar mode, hereinafter described, of forming and uniting the ends or heads of metallic cans or vessels with the sides or bodies thereof, and in the production of cans in which the sides, tops, and bottoms are united or joined together by the means and in the manner hereinafter described.

Figure 1:
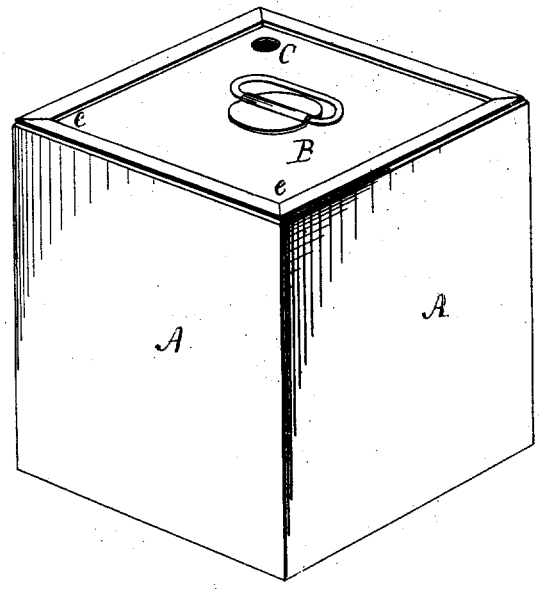
Figure 2:
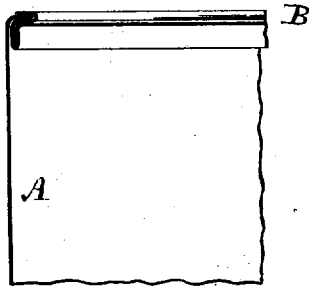

To illustrate my said invention, I have shown in the accompanying drawings, in Figure 1, a perspective view of a can made in accordance with my said invention; Fig. 2, showing a diagram or the sectional lines of a part of the head and side of the can, which together form the joint.

In said drawings, A is the body of the can; B, the head; and C, the orifice filling the can.

To put the parts of the can together I proceed as follows: The can-body is made, as is usual, of one sheet of metal bent along three vertical lines at right angles, the fourth angle being made by the union by lap or hook joint of the outer ends of the sheet. The upper and lower ends are allowed to remain flush with the sides, or unbent until after the heads are put in their respective places on the body.

The heads are made of flat pieces of metal, somewhat larger than the horizontal area or the opening of the can-body. The edges of these heads are bent downward at right angles to the surface, to facilitate which the sheet is previously cut out at the angles. The downwardly-bent flange is, a short distance from the bent edge, bent up outwardly, and this outwardly-bent-up portion, projecting above the head, is outwardly bent down. The head is thus formed with a double flange below and a double flange above the head, the former fitting into the interior of the can, while the latter fits over and incloses within its fold the edge and body of the can. When the can-seams are closed, this outer or upwardly-projecting exterior double flange is, with the edge of the body of the can which is confined therein, bent down inwardly at right angles, or nearly so, upon the head of the can.

It is obvious that the corners at the ends of the can-body are, previously to being bent, suitably cut down to a point corresponding to the surface of the heads, so as to insure their forming, when bent, miters in a workmanlike manner, as shown in the drawing at *e*.

After the heads or ends are thus made and united, molten solder is applied, for the purpose of sealing the joints or seams.

The interior double flange serves to stiffen the heads or ends of the can, and also forms a firm support for clamps, to hold the heads or ends together while the projecting edges are being bent or pressed upon the heads or ends of the can-body.

What I claim, and desire to secure by Letters Patent, is—

1. The formation of a can-seam by forming on the head or end an inwardly-folded or interior double flange, with an extension projecting above the outer surface of said head or end, which projection, being bent outwardly over the edge of the can, is bent down inwardly upon the head at right angles to the sides of the body of the can, as herein shown and described.

2. The union of the body of a can with the heads or ends thereof by means of a seam, consisting of the combination with an internal flange formed at right angles to the body of the can, of a twofold double lap-joint on the head, the one lying internally against the side or body, the other externally against the respective heads of the can, the latter holding confined the flange on the body, substantially as shown and set forth.

3. The angular interior and exterior double flange formed on the heads or ends of a metallic can or vessel, forming a union with the can-body, in the manner and for the purposes herein specified.

In testimony whereof I have hereunto signed my name this 11th day of December, A. D. 1877.

CHAS. P. MAXFIELD.

Witnesses:
A. EDWIN CLARKE,
JOS. TILLINGHAST.